Z. A. CHURCH.
FASTENING FOR TIRE CHAINS.
APPLICATION FILED AUG. 10, 1917.

1,285,942.

Patented Nov. 26, 1918.

INVENTOR:
ZALA A. CHURCH
By Silas C. Sweet
Att'y

UNITED STATES PATENT OFFICE.

ZALA A. CHURCH, OF JEFFERSON, IOWA.

FASTENING FOR TIRE-CHAINS.

1,285,942.  Specification of Letters Patent.  Patented Nov. 26, 1918.

Application filed August 10, 1917. Serial No. 185,493.

*To all whom it may concern:*

Be it known that I, ZALA A. CHURCH, a citizen of the United States of America, and resident of Jefferson, Greene county, Iowa, have invented a new and useful Fastening for Tire-Chains, of which the following is a specification.

The object of this invention is to provide an improved construction for a fastening for cross chains employed on automobile tires to increase the traction and prevent skidding.

A further object of this invention is to provide improved means for separately and readily attaching cross chains to automobile wheels.

A further object of this invention is to provide improved means for readily and conveniently removing and replacing and detachably securing anti-skid and traction chains relative to wheels of motor vehicles.

A further object of this invention is to provide means to prevent wear of the separately secured cross chains on the spokes of the wheel.

My invention consists in the construction, arrangement and combination of elements hereinafter set forth, pointed out in my claims and illustrated by the accompanying drawing, in which—

Figure 1:
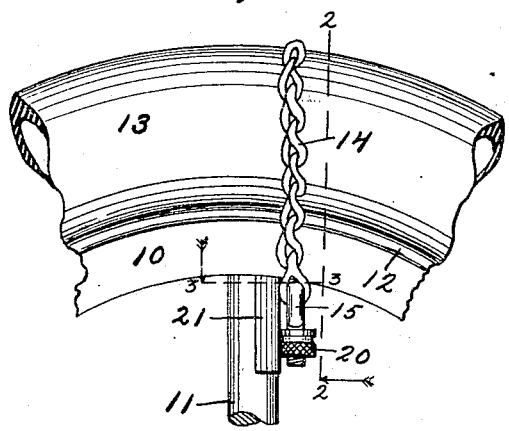
Figure 2:
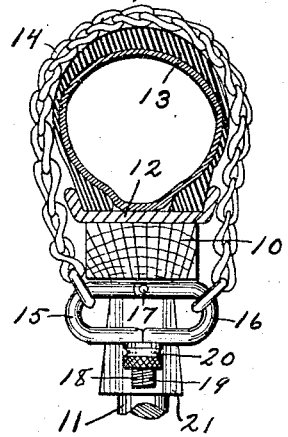
Figure 3:
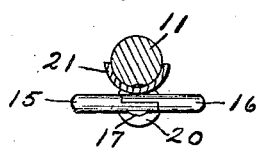
Figure 4:
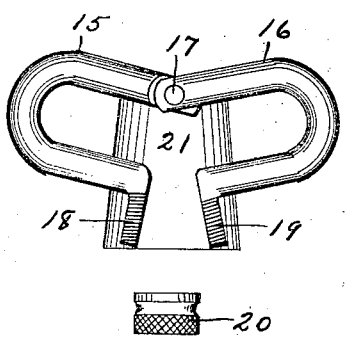

Figure 1 is a side elevation illustrating a portion of a vehicle wheel and cross chain thereon equipped with my improved fastening. Fig. 2 is a cross-section on the line 2—2 of Fig. 1. Fig. 3 is a horizontal section on the line 3—3 of Fig. 1. Fig. 4 is a detail elevation of the fastening detached and in open position.

In the construction and application of the devices as shown the numeral 10 designates a wheel felly and 11 one of the spokes, the felly carrying a rim 12 of any suitable construction and a pneumatic tire 13. The numeral 14 designates an anti-skidding and traction chain, any number of which may be mounted around the tire 13 and secured as hereinafter described by my improved fastening, it being understood that such fastening is designed to connect said chains separately and without the use of the common side chains.

The fastening is composed of counterpart loop or eye members 15, 16 pivoted together at one end by a rivet 17, said loop members preferably being notched or flattened in their overlapping portions as best shown in Figs. 3 and 4. At their opposite or free ends the loop members 15, 16 are formed with integral outstanding lugs 18, 19 respectively, said lugs being semi-circular in cross-section, arranged with their flat faces toward each other and adapted to be brought into contact. The semi-circular lugs 18, 19 are formed with a thread which is continuous around both said members when they are in contact, and a nut 20 is provided and is adapted to be screwed on said lugs to hold them in contacting relation and the loop members in closed position.

The loop members 15, 16 are adapted to engage end links of a cross chain such as 14 and hold said chain in position around the tire 13, the fastening device being arranged with the pivotally connected sides of the loop members in contact with the radially inner surface of the felly 10 as shown in Fig. 2. The fastening device is then closed by moving the lugs 18, 19 into contact, after which the nut 20 is applied to said members and the device is securely held in closed position and retains the chain on the tire.

In use a buffer plate 21 preferably is interposed between the fastening device and the adjacent spoke 11 to the rear of the device, reference being had to the normal direction of rotation of the wheel. The buffer plate 21 is concavo-convex in cross-section and preferably fits snugly to the spoke at its radially outer end but flares outwardly somewhat at its radially inner end to cause said plate to center on the spoke when moving toward it. The pivot 17 of the twin fastening loops 15, 16 is extended through the radially outer end of the buffer plate 21 and secures said devices together, providing a support for the buffer plate.

Considerable convenience is found, both in applying and removing the tire chains, in that said chains are entirely separate from each other and some at least of the chains can be applied to the wheel even when in unhandy position such as in a mud hole. The fastening device shown and described provides a very convenient method of detachably securing the ends of the cross chains as will be apparent.

The device may be formed of iron, steel, or any other suitable metallic material.

I claim as my invention—

1. A device of the class described, comprising a plate and loop members overlapping and extending transversely of one end portion of said plate, the overlapping end portions of said loop members and said plate being pivoted together, the radially outer end portion of said plate being substantially coincident with a plane intersected by the outermost points of the surface of said overlapping end portions.

2. A device of the class described, comprising a plate and loop members overlapping at one end and pivoted together and to the plate, the body of said plate extending across said loop members.

3. In a device of the class described having a chain adapted to extend around a tire and wheel rim, the ends of the chain being spaced apart adjacent the sides of said rim, the combination with end links of said chain of a connecting device comprising counterpart oblong loop members adapted to extend loosely through said end links respectively, said loop members having overlapping ends pivoted together centrally of the space between said end links, the pivoted end portions of said loop members being adapted to aline and contact throughout their lengths with the inner face of the wheel rim, and means for connecting the opposite end portions of said loop members.

ZALA A. CHURCH.

Copies of this patent may be obtained for five cents each, by addressing the "Commissioner of Patents, Washington, D. C."